US011501573B1

(12) United States Patent
Tighe et al.

(10) Patent No.: US 11,501,573 B1
(45) Date of Patent: Nov. 15, 2022

(54) POSE-BASED PERSONAL EQUIPMENT DETECTION

(71) Applicant: Amazon Technologies, Inc., Seattle, WA (US)

(72) Inventors: Joseph P. Tighe, Seattle, WA (US); Meng Wang, Seattle, WA (US); Hao Wu, Seattle, WA (US); Manchen Wang, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 16/894,709

(22) Filed: Jun. 5, 2020

(51) Int. Cl.
G06V 40/20 (2022.01)
G06K 9/62 (2022.01)
G06T 7/00 (2017.01)
G06T 7/11 (2017.01)
G06Q 10/08 (2012.01)

(52) U.S. Cl.
CPC ........... *G06V 40/20* (2022.01); *G06K 9/6256* (2013.01); *G06Q 10/087* (2013.01); *G06T 7/0008* (2013.01); *G06T 7/11* (2017.01)

(58) Field of Classification Search
CPC ............ G06K 9/00335; G06K 9/6256; G06Q 10/087; G06T 7/0008; G06T 7/11
USPC ......................................................... 382/103
See application file for complete search history.

(56) References Cited

U.S. PATENT DOCUMENTS

| 9,695,981 B2 | 7/2017 | Au et al. | |
| 2010/0208987 A1* | 8/2010 | Chang | G06K 9/6224 382/165 |
| 2013/0282609 A1* | 10/2013 | Au | F16P 3/142 705/325 |

* cited by examiner

*Primary Examiner* — Ayodeji O Ayotunde
(74) *Attorney, Agent, or Firm* — S. Scott Foster; Kowert, Hood, Munyon, Rankin & Goetzel, P.C.

(57) ABSTRACT

Personal equipment detection may utilize pose-based detection. Input image data may be evaluated to detect persons in the image data. For detected persons, regions of the persons may be determined. Personal equipment may be detected for the detected persons in the image data and compared with the regions of the persons to determine whether the detected personal equipment is properly placed on the person.

20 Claims, 8 Drawing Sheets

POSE-BASED PERSONAL EQUIPMENT DETECTION

BACKGROUND

Computer vision or other object recognition techniques offers computers many capabilities to performance various tasks that might otherwise be impossible for the computer to perform in different scenarios. Object recognition has, for instance, many different applications to facilitate diverse technologies and systems, including automated vehicle operation, assisted medical operations, or identity services to provide secure payment or other transactions. In order to facilitate object recognition, different models may be implemented to apply objection recognition in different scenarios.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for pose-based personal equipment detection are described herein. Personal equipment is utilized in various scenarios in order to ensure safety, productivity, and/or quality of operations or tasks in different environments. Sensitive manufacturing environments, such as clean rooms, may implement different techniques to reduce particulates in the air in order to prevent damage or contamination during production of sensitive products (e.g., electronic devices, pharmaceuticals, etc.) including relying upon personal equipment, such as gloves, face coverings, bodysuits, shoe coverings, and/or safety glasses. Construction sites, laboratories, and/or medical facilities, among other work environments, may rely upon personal equipment to protect wearers (and/or others) from safety hazards (e.g., falling objections, dangerous chemicals or other substances, etc.). Sporting environments may rely upon personal equipment to provide for safe enjoyment of various sports or other professional/recreational activities (e.g., protective helmets, proper safety straps or harnesses, etc.). For effective use of personal equipment, the personal equipment may need be present (e.g., worn) and properly placed (e.g., good coverage). Therefore, techniques that allow for various systems to automatically detect the presence and proper placement of personal equipment may improve the effectiveness (and thus the performance) of various techniques, operations, and/or procedures in which personal equipment is used.

Figure 1:
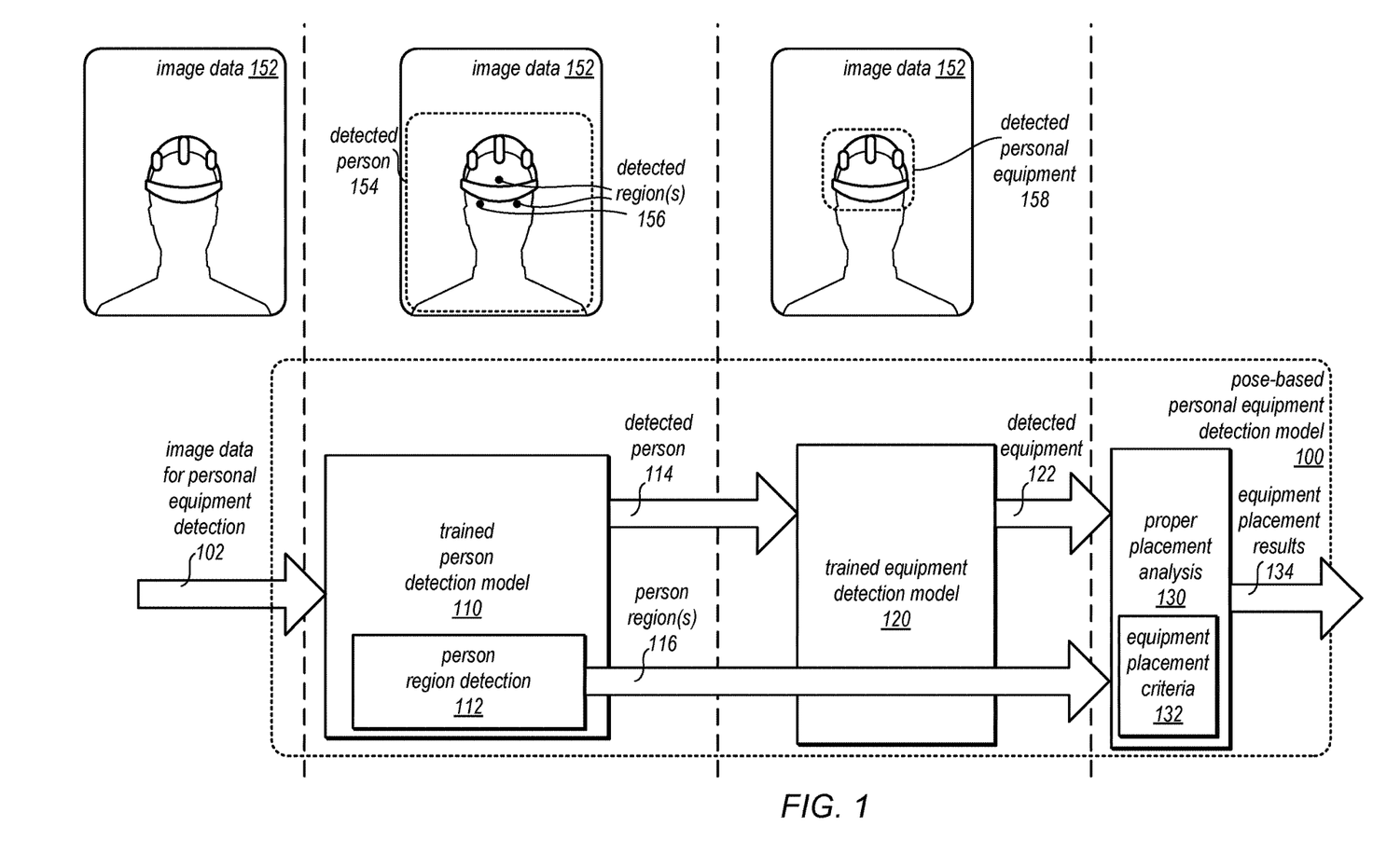
FIG. 1 illustrates a logical diagram of pose-based personal equipment detection, according to some embodiments.

In various embodiments, pose-based personal equipment detection may be implemented to both detect the presence of personal equipment and determine whether placement of the personal equipment is proper. FIG. 1 illustrates a logical diagram of pose-based personal equipment detection, according to some embodiments. Pose-based personal equipment detection model 100 may be applied to image data received, as indicated at 102, for personal equipment detection. Image data 102 may be various types of still images or videos, which may be provided for evaluation using the pose-based personal equipment detection model 100. In some embodiments, additional sensor data such as depth information (e.g., from LiDAR), environmental information (e.g., heat information from infrared), or other types of sensor information (e.g., audio data) can be used as part of equipment detection and/or placement in addition to image data 102.

Pose-based equipment detection model 100 may be implemented as part of various types of systems, services, and/or devices that perform personal equipment detection. For example, a worksite scanner setup to perform a safety check and/or manufacturing equipment check may implement pose-based personal equipment detection model 100, along with one or multiple interfaces for capturing, obtaining, or receiving image data 102 (e.g., implementing cameras or other image sensors that provide still images or video image data). In some embodiments, machine learning systems or object recognition services, such as those discussed below with regard to FIGS. 2-4, may implement pose-based personal equipment detection model 100, which may also implement other object detection and/or classification models or techniques.

In at least some embodiments, pose-based personal equipment detection model 100 may include a trained, person detection model, like trained person detection model 110. For example trained person detection model 110 may be an object classification model using neural networks, such as Regions with Convolutional Neural Network (R-CNN), in some embodiments. Training of such a model may include training a CNN to extract features of various selected regions within input image data and then classifying the features extracted from the selected regions as to whether the features can be classified as a human depicted in the selected region (e.g., using a Support Vector Machine (SVM) for analyzing the extracted features). In some embodiments, different or alternative trained person detection models 110 may be implemented (e.g., Fast R-CNN, You Only Look Once (YOLO), among others). As illustrated in FIG. 1, example image data 152 may be received and trained person detection model 110 may detect a person, as indicated at 154 in image data. A bounding box, or other information indicative of the portion (e.g., subset) of the image data that includes the detected person, may be determined when detection occurs, in some embodiments.

As part of (or in addition to) the features used to identify a detected person, person region detection 112 may be performed, in various embodiments. For example, regions may be spatial locations, areas, or other points of interest (e.g., keypoints, detected body parts, body sections, image sections, etc.) of image data which may be used, among other applications to determine a pose of a detected person, in some embodiments. The pose may be indicative of locations personal equipment may be expected, in some embodiments. For example, as indicated at 156, regions of detected person 154 can be used for a placement analysis for personal equipment.

Pose-based personal equipment detection model 100 may include a trained equipment detection model 120, in some embodiments. The detected person 114 may be provided for analysis using trained equipment detection model 120 (e.g., by limiting equipment search to the portion of image data described by a bounding box for the detected person 114), in some embodiments. For example, similar to trained person detection model, an object detection and classification model may be implemented (e.g., R-CNN, other CNNs, and so on). The trained equipment detection model 120 may be trained may be trained to classify the features of possible personal equipment extracted from within the portion of image data that includes the detected person. For example, various types of personal equipment, including, but not limited to, various kinds of garments, suits, vests, footwear (e.g., specialized shoes, shoe covers, grounding straps, etc.), head covers (e.g., helmets, caps, nets, etc.), hand wear (e.g., gloves, grounding straps, etc.), eye wear (e.g., safety glasses, goggles, shields, etc.), or other equipment (e.g., breathing apparatus, such as respirators), in some embodiments. Different types of classifiers (e.g., different respective SVMs) may be applied for each type of personal equipment, in some embodiments. For example, detected personal equipment 158 may be a helmet, which may be recognized by a helmet classifier for trained equipment detection model 120. Although not illustrated, multiple personal equipment objects can be detected for one detected person (as discussed below with regard to FIG. 6).

Figure 5:
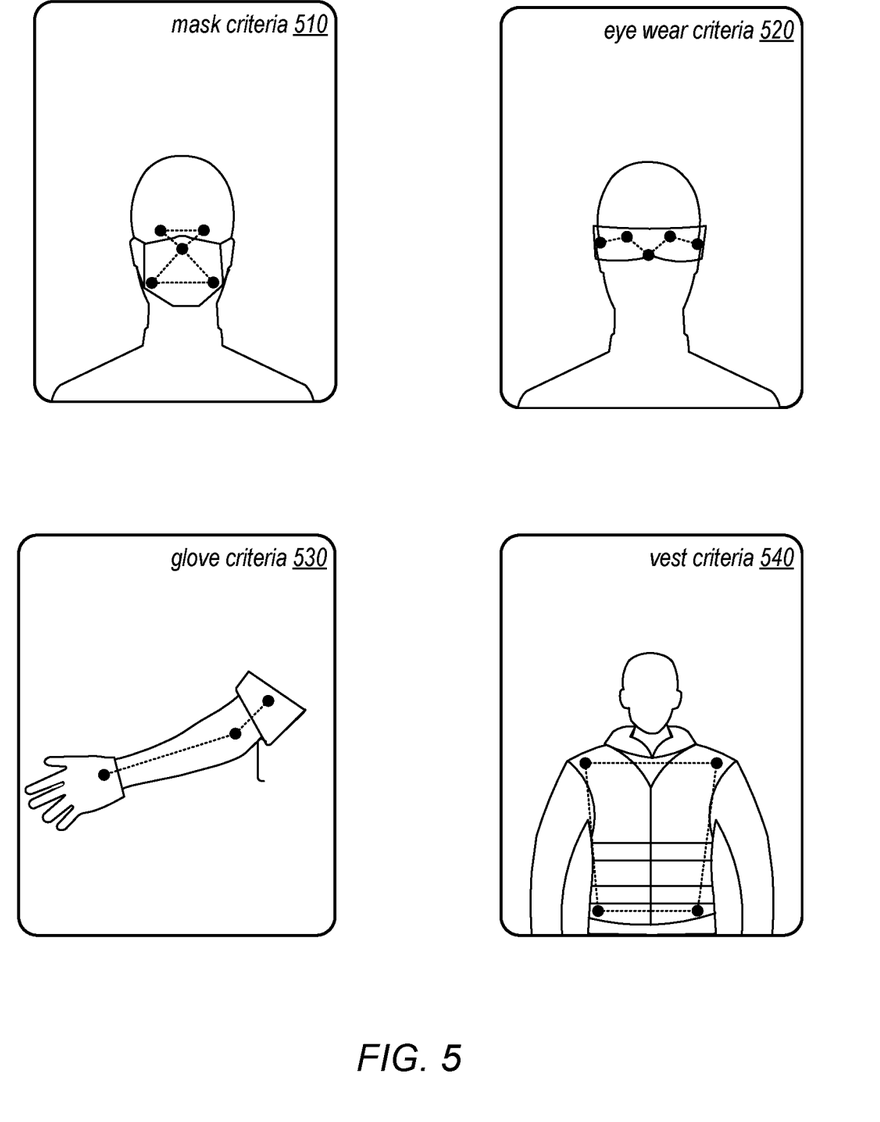
FIG. 5 illustrates example equipment placement criteria for different types of personal equipment, according to some embodiments.

Pose-based personal equipment detection model 100 may include proper placement analysis 132 for detected equipment 122. Person regions 116 may be evaluated with respect to placement criteria 132 for the detected equipment 158. In this way, the proper placement of the equipment can be determined according to the pose indicated by the location of the regions relative to the detected equipment. FIG. 5 discusses various examples of equipment placement criteria 132 that can be implemented. In FIG. 1, for example, regions 156 may indicate a brow line feature of detected person as a third region relative to two other eye regions. In such an example, helmet placement criteria could require the brow region to be located within (or covered by) area within the detected helmet object (e.g., to insure that the helmet is not too low or too high).

Figure 3:
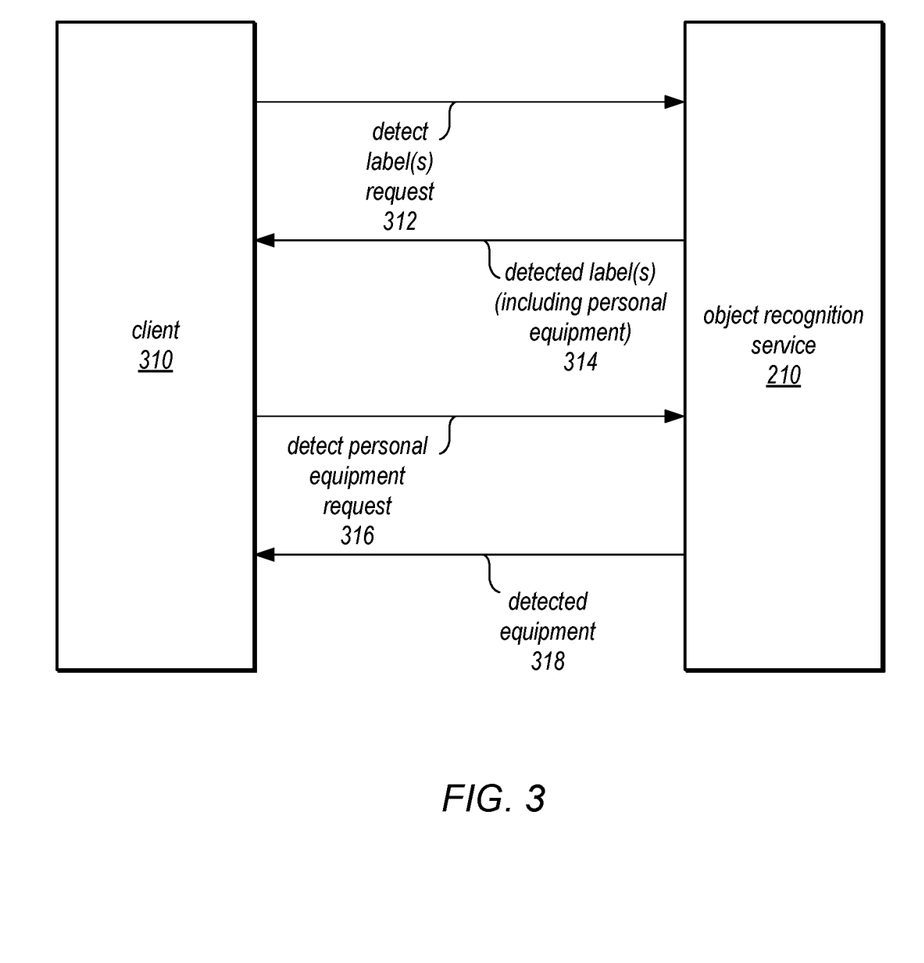
FIG. 3 illustrates a logical block diagram for pose-based personal equipment detection at an object recognition service, according to some embodiments.
Figure 4:
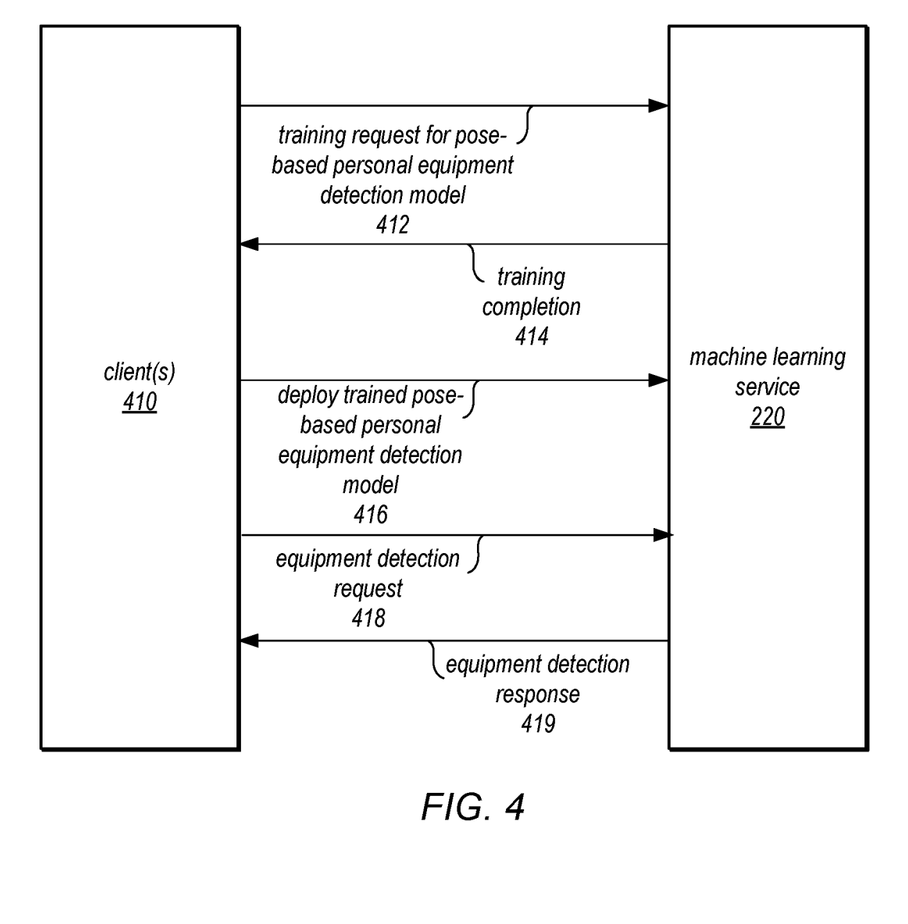
FIG. 4 illustrates a logical block for pose-based personal equipment detection at a machine learning service, according to some embodiments.

Equipment placement results 134 may be generated and provided for image data 152. Detected persons as well as detected and properly placed equipment may be identified (e.g., by labels). In some embodiments, additional information such as confidence scores or values associated with the detected person and/or detected/placed equipment may be provided. In this way, clients of pose-based personal detection model 100 can implement various result handling scenarios, which may be dependent upon the confidence value. FIGS. 3 and 4 provide examples of responses that can be generated and sent.

Please note that the previous description of pose-based personal equipment detection is a logical illustration and thus is not to be construed as limiting as to the implementation of a trained person detection model, trained equipment detection model and/or proper placement analysis. Different orderings of pose-based personal equipment detection model 100 features can be implemented in some embodiments. For example, trained equipment detection model 120 can be performed in parallel (or before) trained person detection model). Person region detection 112 can be determined using a separate model or analysis, in some embodiments.

This specification begins with a general description of a provider network that implements multiple different services, including an object recognition service and machine learning service, which may implement pose-based personal equipment detection. Then various examples of, including different components/modules, or arrangements of components/module that may be employed as part of implementing the services are discussed. A number of different methods and techniques to implement pose-based personal equipment detection are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
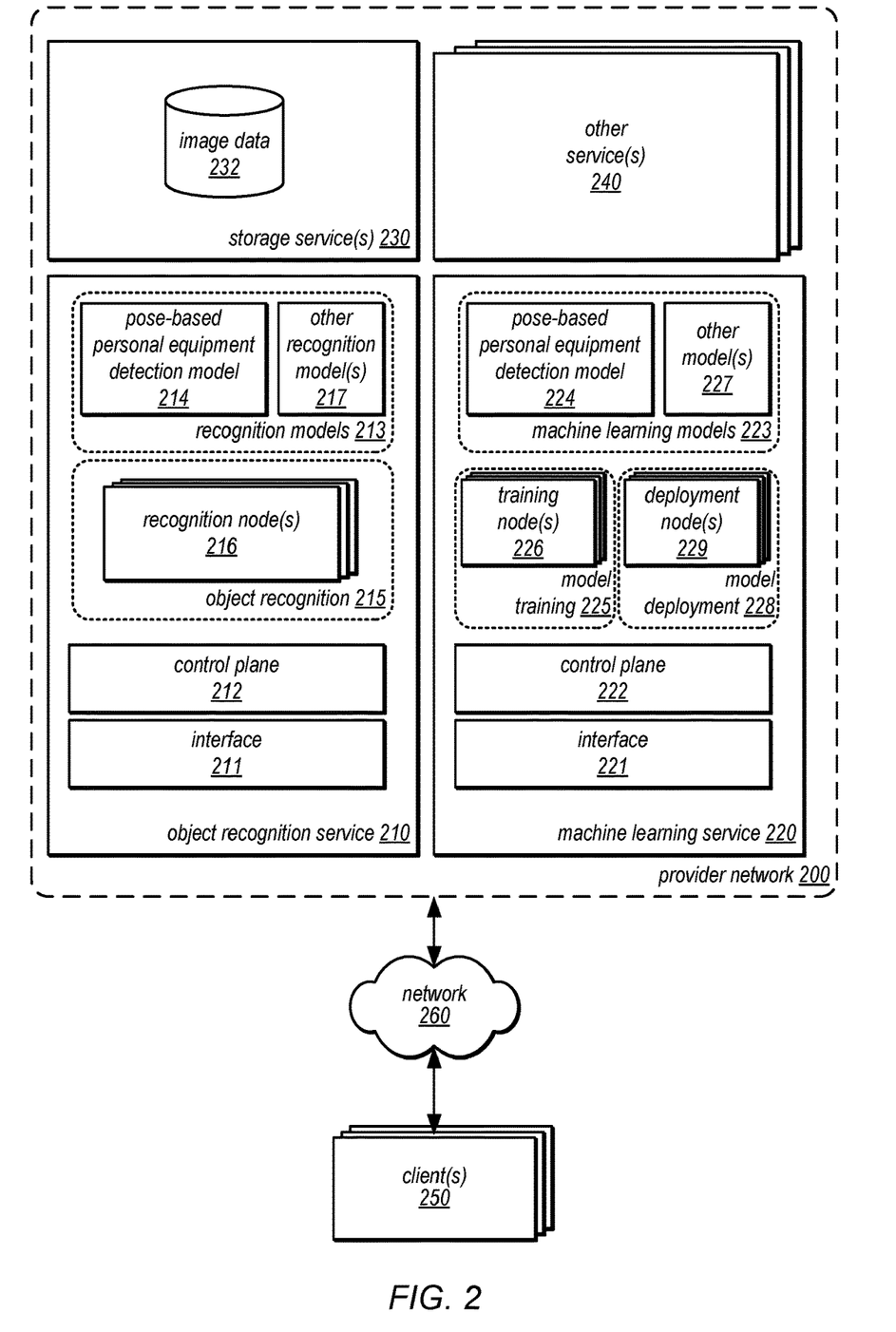
FIG. 2 illustrates an example provider network that may implement different services that implement a model for pose-based personal equipment detection, according to some embodiments.

FIG. 2 illustrates an example provider network that may implement different services that implement a model for pose-based personal equipment detection, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as object recognition service 210, machine learning service 220, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of object recognition service 210 or machine learning service 220 may be implemented by a particular node or may be distributed across several nodes. In some embodiments, a given node may implement the functionality of more than one service system component (e.g., more than one data store component).

Object recognition service 210 may implement interface 211 to allow clients (e.g., client(s) 250 or clients implemented internally within provider network 200, such as a client application hosted on another provider network service like an event driven code execution service or virtual compute service) to analyze objects included in data, such as image data (which may be found in various types of media, such as still images or video data) or other data (e.g., text/character strings for natural language processing). For example, object recognition service 210 may implement interface 211 (e.g., a graphical user interface, programmatic interface that implements Application Program Interfaces (APIs) and/or a command line interface) may be implemented so that a client can request one or more labels be detected or specified for image data 232 stored in storage service(s) 230, and/or image data (or other sensor data) in other storage locations within provider network 200 or external to provider network 200 (e.g., on premise data storage in private networks), as discussed below with regard to FIG. 3. Interface 211 may allow a client to request the performance of an analysis using recognition models 213, like posed-based personal equipment detection model 214, as discussed in detail below with regard to FIG. 3, as well as other recognition models 217 (e.g., general object recognition or other specialized object recognition models).

Object recognition service 210 may implement a control plane 212 to perform various control operations to implement the features of object recognition service 210. For example, control plane may monitor the health and performance of requests at different components, recognition nodes 216. If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) (e.g., to different recognition nodes 216), in various embodiments. For example, control plane 212 may receive requests interface 211 which may be a programmatic interface, and identify an available node to begin work on the request.

Object recognition service 210 may implement object recognition 215, as discussed in detail above with regard to FIG. 1 and below with regard to FIGS. 3 and 5-7. Recognition nodes(s) 216 may perform various stages, operations, or tasks of analyzing data utilizing pose-based personal equipment detection model 214 or other recognition models 217 (e.g., individually or as a cluster/group of nodes), in some embodiments. For example, recognition node(s) 216 may be organized as a processing pipeline to handle different stages of pose-based personal equipment detection model (e.g., a group of nodes implementing person detection model(s), a second group of nodes implementing equipment detection model(s), and a third group of nodes performing placement analysis).

Machine learning service 220 may implement interface 221 to allow clients (e.g., client(s) 250 or clients implemented internally within provider network 200, such as a client application hosted on another provider network service like an event driven code execution service or virtual compute service) to train and deploy various machine learning models 223, including pose-based personal equipment detection model 224 and other model(s) 227, on training and input image data, such as image data (which may be found in various types of media, such as still images or video data) or other data (e.g., text/character strings for natural language processing). For example, machine learning service 220 may implement interface 221 (e.g., a graphical user interface, programmatic interface that implements Application Program Interfaces (APIs) and/or a command line interface) may be implemented so that a client can request training of a model 223 or deployment of a model 223, as discussed below with regard to FIG. 4. Training data may be like image data 232, and/or image data in other storage locations within provider network 200 or external to provider network 200 (e.g., on premise data storage in private networks). Similarly, input data for performing an equipment detection analysis may be like image data 232, and/or image data (or other sensor data) in other storage locations within provider network 200 or external to provider network 200 (e.g., on premise data storage in private networks). Interface 221 may allow a client to request the performance of training or analysis using posed-based personal equipment detection model 224, as discussed in detail below with regard to FIG. 4, as well as other machine learning models 223 (e.g., general object recognition, other specialized object recognition models, or non-object recognition models (e.g., recommendation systems, forecasting, etc.)).

Machine learning service 220 may implement a control plane 222 to perform various control operations to implement the features of machine learning service 220. For example, control plane may monitor the health and performance of requests at different components, training node(s) 226 performing model training 225 and/or deployment node(s) 229 performing model deployment 228. If a node fails, a request fails, or other interruption occurs, control plane 22 may be able to restart a job to complete a request (e.g., instead of sending a failure response to the client). Control plane 22 may, in some embodiments, may arbitrate, balance, select, or dispatch requests to different node(s) (e.g., to different deployment nodes 229), in various embodiments. For example, control plane 222 may receive requests via interface 221 which may be a programmatic interface, and identify an available node to begin work on the request.

Machine learning service 220 may implement model training 225, as discussed below with regard to FIG. 4. Training nodes(s) 226 may perform various stages, operations, or tasks of analyzing training data to apply an algorithm to train various portions of pose-based personal equipment detection model 224 (e.g., by training the types of personal equipment to detect) and/or other model(s) 227, in some embodiments.

Machine learning service 220 may implement model deployment 229, as discussed below with regard to FIG. 4.

Deployment nodes(s) 229 may perform various stages, operations, or tasks of applying a deployed model (e.g., pose-based personal equipment detection model) to recognize and determine whether equipment in the image data is properly placed (e.g., using a pose-based personal equipment detection model trained using training node(s) 226), in some embodiments.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for object recognition service 210 (e.g., a request to label image data, etc.) and/or requests for machine learning service 220 (e.g., a request to deploy a pose-based personal equipment detection model). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of Object recognition service 210 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like object recognition service 210 and machine learning service 220) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

FIG. 3 illustrates a logical block diagram for pose-based personal equipment detection at an object recognition service, according to some embodiments. Client 310 may be similar to clients 250, discussed above with regard to FIG. 2. Client 310 may be implemented as part of various systems or services (e.g., like the worksite check or evaluation discussed above with regard to FIG. 1), which may utilize label(s) determined for input image data to perform various operations. For example, client 310 may perform an equipment check that triggers admission to a clean room or other highly sensitive area after equipment and placement of equipment is confirmed for an individual.

In some embodiments, detect label(s) request 312 may specify various configuration parameters or other information for performing the analysis of image data by object recognition service 210. For example, the request may specify the minimum confidence threshold applied, maximum number of labels return, types of equipment to check for, among other configuration information. In some embodiments, a specific version of a pose-based personal equipment detection model may be specified. In some embodiments, a result location or response location may be specified. The request 312 may specify the location of (or include) the input image data for labeling.

Object recognition service 210 may dispatch the request 312 to one (or more) recognition nodes 216, which may perform the various stages of labeling for the input image data. For example, multiple recognition models 213 may be used (including a pose-based equipment detection model 214), to identify and label various features of the input image data, in some embodiments. For example, one or more nodes may apply a person detection model 110 to detect person(s) and region(s) for the person(s), a second stage of one or more nodes may apply the equipment detection model 120 to detect equipment for detected persons, and one or more nodes of a third stage may perform proper placement analysis using equipment placement criteria for the detected personal equipment. Detected labels, including personal equipment 314, may be returned by object recognition service 210, in response to the request. Descriptive information about the labels, including bounding box or other location information and confidence value or scores for the label classification may be included in the response 314.

In some embodiments, object recognition service 210 may implement an interface or request (e.g., an API) that specifically invokes personal equipment detection, such as detect personal equipment request 316. For example, detect personal equipment request may, similar to label request 312, specify various configuration parameters or other information for performing the equipment detection, specify a specific version of a pose-based personal equipment detection model, specify a result location or response location, and/or specify the location of (or include) the input image data for personal equipment detection. In this way, object recognition service 210 may limit the labels returned to detected equipment labels, as indicated at 318.

FIG. 4 illustrates a logical block for pose-based personal equipment detection at a machine learning service, according to some embodiments. Client(s) 410 may be similar to clients 250, discussed above with regard to FIG. 2. Machine learning service 220 may provide training in addition to deployment of various machine learning models. In at least some embodiments, machine learning service 220 may support training requests, such as training request 412, for a posed-based personal equipment detection model. In this way, various aspects of a pose-based personal equipment detection model can be trained for specific types or environments of personal equipment detection (e.g., particular types or categories of personal equipment and/or particular types of scenes, such as large groups of individuals, in which personal equipment may be depicted). Training request 412 may identify the training data, training technique, training configuration parameters (e.g., stop conditions), and/or other information used to perform training of a pose-based personal equipment detection model.

Machine learning service 220 may dispatch the training request to one (or multiple) training nodes 226 to perform training on the pose-based personal equipment detection model. For example, configuration information determined from or specified in training request 412 may be used to configure the training node(s) 226 used to execute a job to perform training request 412. Training data for the training job may be requested or read from specified locations in training request 412 and analyzed according to the specified training technique. As indicated at 414, training completion may be indicated to client(s) 410, including an identifier and/or storage location of the trained model, which may be obtained by client(s) 410 for deployment outside of provider network services, in some embodiments.

In some embodiments, the trained pose-based personal equipment detection model may be deployed at machine learning service 220. For example, a request 416 to deploy a trained pose-based personal equipment detection model 416 may be received at machine learning service 220 from client(s) 410. Request 416 may specify various performance and/or deployment configuration information (e.g., number hosts or resources to provide a desired request performance time). Request 416 may specify an identifier for the trained pose-based personal equipment detection model, in some embodiments, provided by machine learning service 220 (as discussed above). A network endpoint or other interface may be set up for the deployment nodes 229 that host the trained pose-based personal equipment detection model for receiving requests. The network endpoint may be provided to client(s) 410, in some embodiments. As indicated at 418, an equipment detection request from the same (or different) client(s) 410 may be sent to the deployed model in machine learning service 220. Similar to the equipment detection requests discussed above with regard to FIG. 3, deployment node(s) 229 may apply the trained pose-based personal equipment detection model to specified input image data and if detected returning personal equipment in an equipment detection response, as indicated at 419.

Different types of equipment may apply different criteria in order to determine whether detected personal equipment in image data is properly placed. FIG. 5 illustrates example equipment placement criteria for different types of personal equipment, according to some embodiments. For example, mask placement criteria 510 may utilize regions to project from nose and eye regions a mouth/jaw area that should be covered by a mask (e.g., as depicted by the dotted lines between key points). The pose of a detected person as reflected by the regions may indicate a proper the location of the mask image data and thus may allow for proper placement analysis to adapt according to different poses of the detected person (e.g., in order to evaluate scenarios where a head is turned at different angles or is capture from different angles in image data).

Eye wear criteria 520 may be another example of a type of personal equipment placement criteria, in some embodiments. For example, eye wear criteria 520 may utilize regions to project from nose, eye, and ear regions an eye area on a face that should be covered by an eye wear object (e.g., as depicted by the dotted lines between key points). Similarly, glove criteria 530 may be another example of a type of personal equipment placement criteria, in some embodiments. For example, glove criteria 530 may utilize regions to project from shoulder, elbow and wrist regions a hand/wrist/arm area on a body that should be covered by a glove object (e.g., as depicted by the dotted lines between key points). As two gloves may be desirable, in some circumstances, the same criteria may be applied to detect a second glove in a different location according to the pose indicated by regions for a second arm. In another example, vest criteria 540 may be another example of a type of personal equipment placement criteria, in some embodiments. For example, vest criteria 540 may utilize regions to project upper body regions, such as shoulders and waist, a vest area on a torso that should be covered by a vest object (e.g., as depicted by the dotted lines between key points).

Please note that the previous examples are not intended to be limiting of proper placement criteria for the depicted personal equipment. Additional various other types of equipment may have other respective proper placement criteria. In some embodiments, proper placement of equipment may include compositions of multiple personal equipment objects (e.g., a seam of a suit should connect or overlap directly with a glove indicating that no skin or other separation between suit and glove is present). In some embodiments, other sensor data, including depth, environmental, and/or auditory information may be included for evaluating proper placement. For example, depth information can be used to measure the depth between placed equipment and other surfaces. In another example, auditory information can evaluate for clicks, snaps, or other sounds indicative of proper equipment fastening or securing. In another example, heat information can indicate whether protective coverings cover or expose warm surfaces (e.g., skin).

Although FIGS. 2-5 have been described and illustrated in the context of a provider network implementing an object recognition service and machine learning service, the various components illustrated and described in FIGS. 2-5 may be easily applied to other systems that utilize personal equipment detection to perform various types of analyses and actions. As such, FIGS. 2-5 are not intended to be limiting as to other embodiments of pose-based personal equipment detection.

Figure 6:
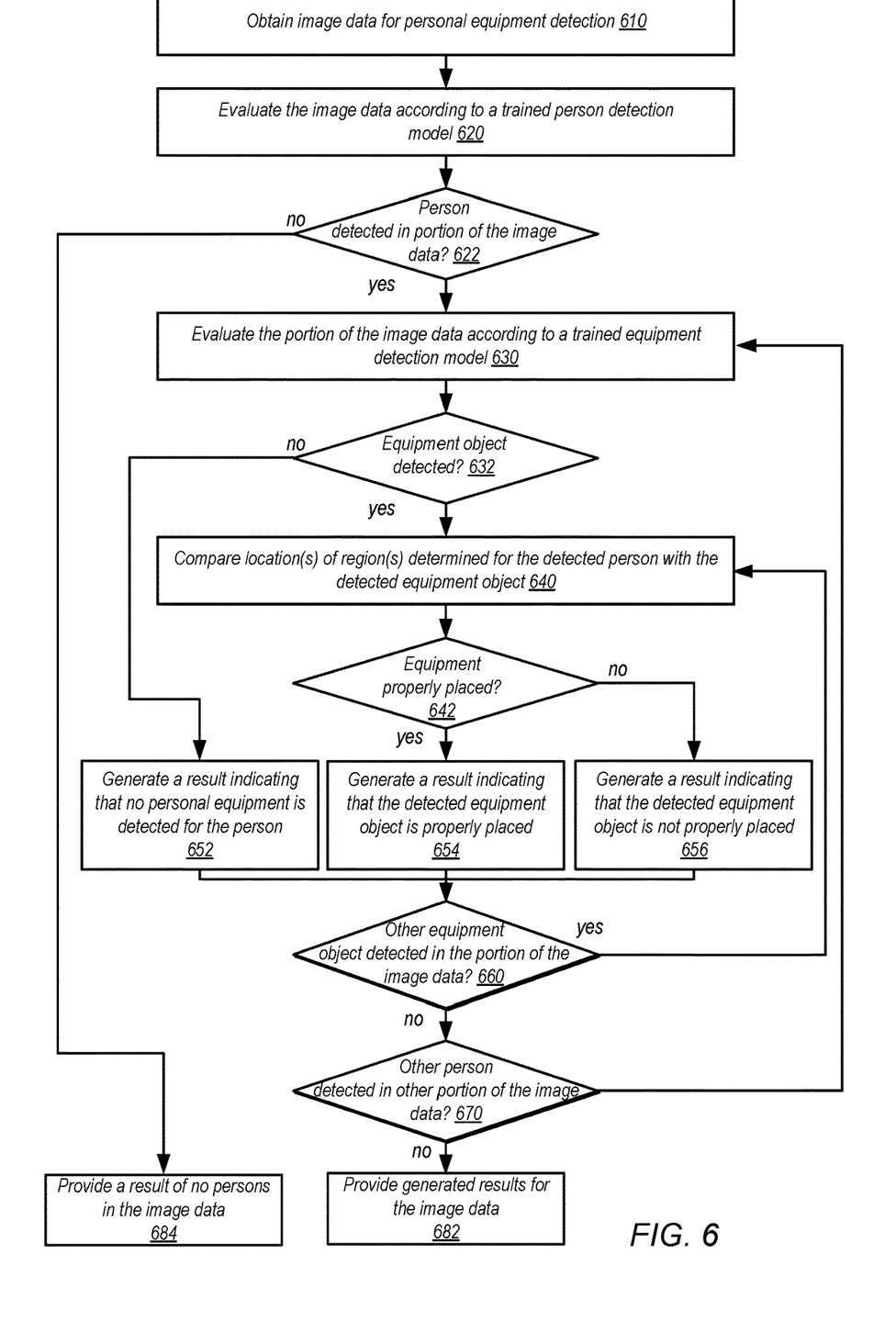
FIG. 6 illustrates a high-level flowchart of various methods and techniques to implement pose-based personal equipment detection, according to some embodiments.

FIG. 6 illustrates a high-level flowchart of various methods and techniques to implement pose-based personal equipment detection, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, image data for personal equipment detection 610 may be obtained, in some embodiments. For example, the image data may be read from or copied from a storage location. In some embodiments, the image data may be a video feed or stream that is transferred or sent directly to a system or service perform personal equipment detection from a client device (e.g., directly from a camera or other image sensor).

As indicated at 620, the image data may be evaluated according to a trained person detection model, in some embodiments. For example, as discussed above with regard to FIG. 1, person detection models, such as R-CNNs or other computer vision models trained for person detection may be applied to the data (e.g., by examining different portions of the image data to extract features and determine whether extracted features indicate that a person is depicted in the portion of the image data. If no person is detected in the image data, then as indicated by the negative exit from 622, a result may be provided that indicates that no persons were detected in the image data, in some embodiments.

If a person is detected in a portion of the image data, as depicted by the positive exit from 622, then the portion of the image data with the detected person may be evaluated according to a trained equipment detection model, as indicated at 630, in various embodiments. For example, as discussed above with regard to FIG. 1, an equipment detection model may utilize classification models for different types of equipment to determine whether features within the portion of the image data include equipment of that type. If no equipment object is detected, then as indicated by the negative exit from 632, a result indicating that no personal equipment is detected for the person, as indicated at 652, may be provided, in some embodiments. The result may, in some embodiments, still provide the indication of the detected person (e.g., a bounding box for the person).

If an equipment object is detected in the portion of the image data of the detected person, as indicated by the positive exit from 632, then a comparison of location(s) of region(s) determined for the detected person with the detected equipment object may be made, in some embodiments. As discussed in detail with regard to FIG. 7, different types of placement criteria may be applied according to the type of equipment object detected. If the equipment is properly placed, as indicated by the positive exit from 642, then a result may be generated indicating that the detected equipment object is properly placed. In some embodiments, proper placement may have to satisfy a minimum confidence value or threshold (in addition to placement criteria) to be considered properly placed (e.g., confidence greater than 60%). The result may include a bounding box or other descriptive information for the personal equipment and the confidence score, in some embodiments. If the equipment is not properly placed, as indicated by the negative exit from 642, then a result may be generated indicating that the detected equipment object is not properly placed may be provided, in some embodiments. For example, an equipment object may be described by a bounding box but have a confidence value of zero or may have a label or other descriptor of improper placement.

Analysis of image data may continue for a detected person if, as indicated by the positive exit from 660, other equipment object(s) are detected in the portion of the image data with the detected person. Similarly, as indicated at 670, if another person is detected in another portion of the image data, similar personal equipment detection and placement techniques may be applied. If not, then generate results for the image data may be provided, as indicated at 682 (e.g., by sending a response to a request or storing the results in a specified storage location).

Figure 7:
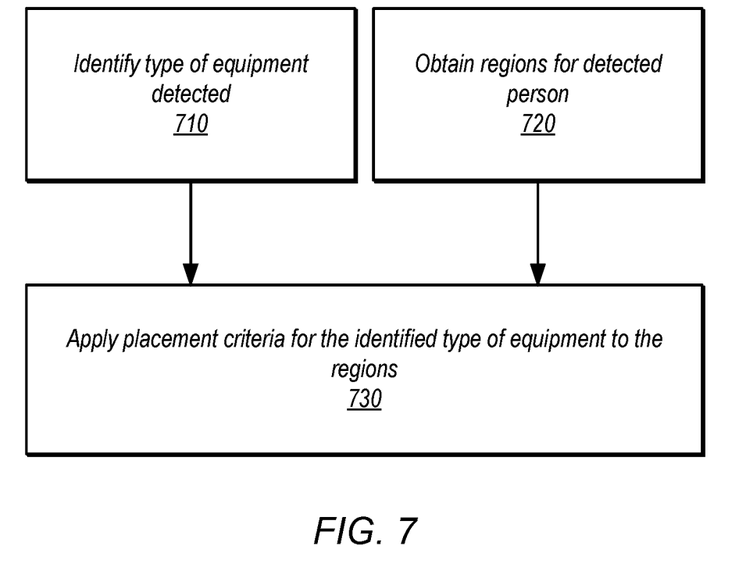
FIG. 7 illustrates a high-level flowchart of various methods and techniques to implement applying equipment type placement criteria for evaluating proper placement of detected equipment objects, according to some embodiments.

As noted above, different types of personal equipment may be detected, which may be properly placed in different ways. FIG. 7 illustrates a high-level flowchart of various methods and techniques to implement applying equipment type placement criteria for evaluating proper placement of detected equipment objects, according to some embodiments. As indicated at 710, a type of equipment detected may be identified, in some embodiments. For instance, a type value or other indicator may be set to true (or with the type name) when a classifier for that type detects that type of equipment. The region(s) for the detected person may also be obtained, in some embodiments, as indicated at 720.

The placement criteria for the identified type of criteria may be applied to the regions, in some embodiments, as indicated at 730. For example, a classifier may take as input the equipment object image data and regions and use a type-specific classifier (e.g., a support vector machine trained for that type of personal equipment or a rule set for classifying placement of that type of personal equipment) to determine whether the specific type of equipment is properly placed (as opposed to being merely present). In some embodiments, some equipment may have placement criteria that identifies overlapping or related equipment (e.g., eye wear and face mask) in order to determine that both are correctly placed. As noted above with regard to FIG. 5, in some embodiments, non-image sensor data may also be considered and/or evaluated for determining personal equipment is properly placed.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
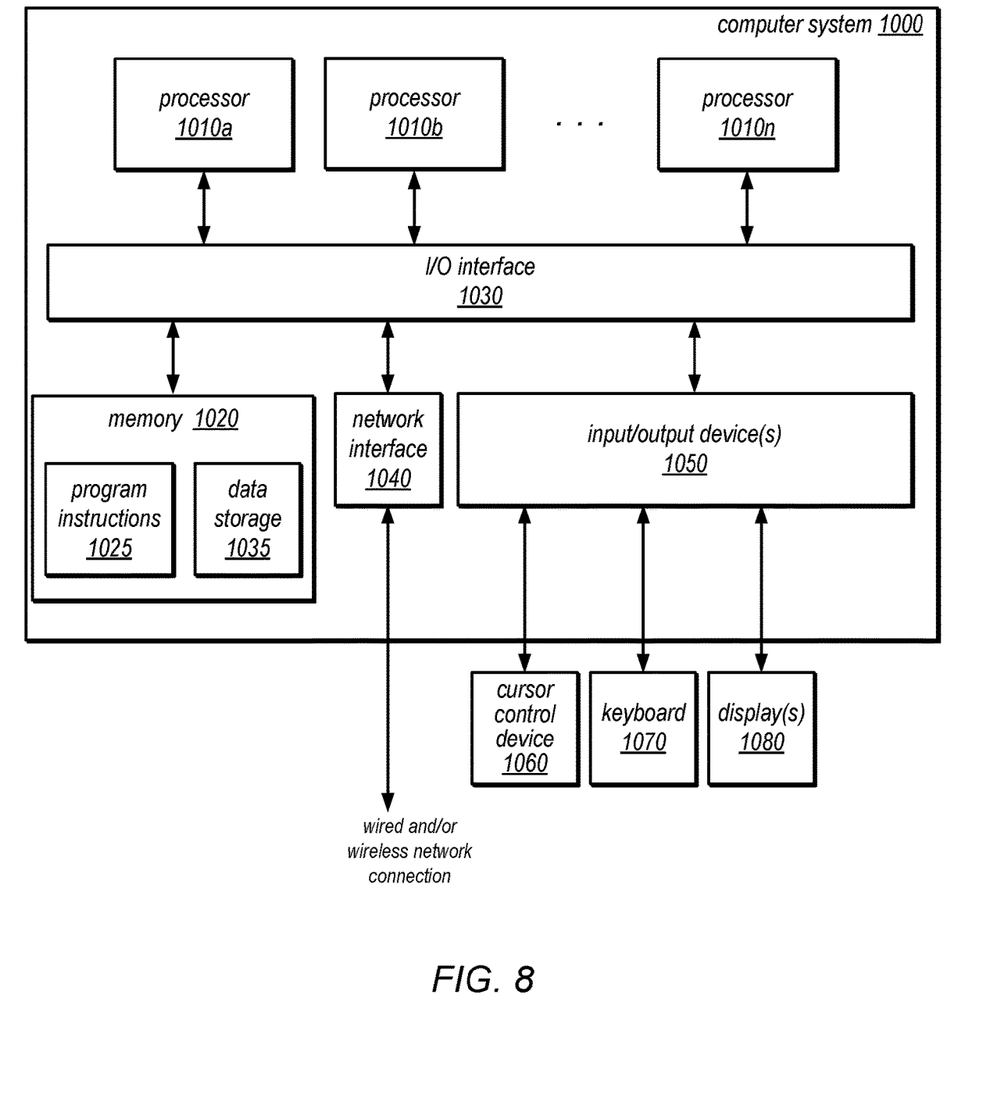
FIG. 8 illustrates an example system to implement the various methods, techniques, and systems described herein, according to some embodiments.

Embodiments of pose-based personal equipment detection as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, including the application of a pose-based personal equipment detection model to detect and determine proper placement of personal equipment in image data, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 at least one processor; and
 a memory, storing program instructions that when executed by the at least one processor, cause the at least one processor to implement:
  receive a request to label personal equipment detected in image data;
  apply a trained person detection model to:
   detect that a portion of the image data includes a person; and
   determine one or more regions for the person within the portion of the image data;
  apply a trained equipment detection model to the portion of the image data to detect an equipment object;
  compare respective locations of the one or more regions with the detected equipment object to determine whether the equipment object is properly placed with respect to the respective locations of the one or more regions; and
  return a label for the image data based, at least in part, on the determination of whether the equipment object is properly placed with respect to the respective locations of the one or more regions.

2. The system of claim 1, wherein the determination of whether the equipment object is properly placed with respect to the respective locations of the one or more regions determines that a confidence value for the placement of the detected equipment object exceeds a minimum confidence threshold, and wherein the label is returned with the confidence value.

3. The system of claim 1, wherein to compare the respective locations of the one or more regions with the detected equipment object to determine whether the equipment object is properly placed, the program instructions cause the at least one processor to apply placement criteria for an identified type of equipment for the detected equipment object.

4. The system of claim 1, wherein the at least one processor and the memory are implemented as part of an object recognition service offered by a provider network and wherein the request to label personal equipment detected in the image data is received via an interface for the object recognition service.

5. A method, comprising:
obtaining image data for personal equipment detection;
evaluating the image data according to a trained person detection model to:
  detect that a portion of the image data includes a person; and
  determine one or more regions for the person within the portion of the image data;
evaluating the portion of the image data according to a trained equipment detection model to detect an equipment object;
comparing respective locations of the one or more regions with the detected equipment object to determine whether the equipment object is properly placed with respect to the respective locations of the one or more regions; and
generating a result of the determination of whether the equipment object is properly placed with respect to the respective locations of the one or more regions.

6. The method of claim 5, wherein the comparing the respective locations of the one or more regions with the detected equipment object to determine whether the equipment object is properly placed comprises applying placement criteria for an identified type of equipment for the detected equipment object.

7. The method of claim 5, further comprising:
obtaining further image data for personal equipment detection;
evaluating the further image data according to the trained person detection model to determine that the further image data does not include a person; and
generating a result that indicates that the further image data does not include a person.

8. The method of claim 5, further comprising:
obtaining further image data for personal equipment detection;
evaluating the further image data according to the trained person detection model to:
  detect that a portion of the further image data includes another person; and
  determine one or more regions for the other person within the portion of the further image data;
evaluating the portion of the further image data according the a trained equipment detection model to determine that the other person does not include an equipment object; and
generating a result that indicates that the further image data does not include an equipment object for the further person.

9. The method of claim 5, further comprising:
evaluating the portion of the image data according to the trained equipment detection model to detect another equipment object;
comparing respective locations of the one or more regions with the detected other equipment object to determine whether the other equipment object is properly placed with respect to the respective locations of the one or more regions; and
generating a result of the determination of whether the other equipment object is properly placed with respect to the respective locations of the one or more regions.

10. The method of claim 5, wherein the image data is video.

11. The method of claim 5, wherein the result indicates that the placement of the equipment object is not proper.

12. The method of claim 5, wherein the determination of whether the equipment object is properly placed with respect to the respective locations of the one or more regions determines that a confidence value for the placement of the detected equipment object exceeds a minimum confidence threshold, and wherein the result includes the confidence value.

13. The method of claim 5, further comprising:
evaluating the image data according to the trained person detection model to:
  detect that another portion of the image data includes another person; and
  determine one or more other regions for the other person within the other portion of the image data;
evaluating the other portion of the image data according to the trained equipment detection model to detect another equipment object;
comparing respective locations of the one or more other regions with the detected other equipment object to determine whether the other equipment object is properly placed with respect to the respective locations of the other one or more regions; and
generating a result of the determination of whether the other equipment object is properly placed with respect to the respective locations of the other one or more regions.

14. One or more non-transitory, computer-readable storage media, storing program instructions that when executed on or across one or more computing devices cause the one or more computing devices to implement:
receiving image data for personal equipment detection;
evaluating the image data according to a trained person detection model to:
  detect that a portion of the image data includes a person; and
  determine one or more regions for the person within the portion of the image data;
evaluating the portion of the image data according to a trained equipment detection model to detect an equipment object;
comparing respective locations of the one or more regions with the detected equipment object to determine whether the equipment object is properly placed with respect to the respective locations of the one or more regions; and
sending an indication of a result of the determination of whether the equipment object is properly placed with respect to the respective locations of the one or more regions.

15. The one or more non-transitory, computer-readable storage media of claim 14, storing further instructions that when executed by the one or more computing devices cause the one or more computing devices to further implement:

evaluating the portion of the image data according to the trained equipment detection model to detect another equipment object;

comparing respective locations of the one or more regions with the detected other equipment object to determine whether the other equipment object is properly placed with respect to the respective locations of the one or more regions; and generating a result of the determination of whether the other equipment object is properly placed with respect to the respective locations of the one or more regions.

16. The one or more non-transitory, computer-readable storage media of claim 14, wherein the result indicates that the placement of the equipment object is proper.

17. The one or more non-transitory, computer-readable storage media of claim 14, wherein the result indicates that the placement of the equipment object is not proper.

18. The one or more non-transitory, computer-readable storage media of claim 14, wherein, in the comparing the respective locations of the one or more regions with the detected equipment object to determine whether the equipment object is properly placed, the program instructions cause the one or more computing devices to implement applying placement criteria for an identified type of equipment for the detected equipment object.

19. The one or more non-transitory, computer-readable storage media of claim 18, wherein the application of the placement criteria for the identified type of equipment for the detected equipment object includes an evaluation of non-image sensor data.

20. The one or more non-transitory, computer-readable storage media of claim 14, wherein the one or more computing devices are implemented as part of a machine learning service offered by a provider network and wherein the machine learning service received a request to deploy a model that causes performance of the evaluating the image data according to a trained person detection model, the evaluating the portion of the image data according to a trained equipment detection model, the comparing respective locations of the one or more regions with the detected equipment object, and the sending the indication of a result of the determination of whether the equipment object is properly placed.

* * * * *